June 4, 1935.  P. W. EELLS  2,003,351
POWER CONTROL
Filed Feb. 28, 1931   2 Sheets-Sheet 2
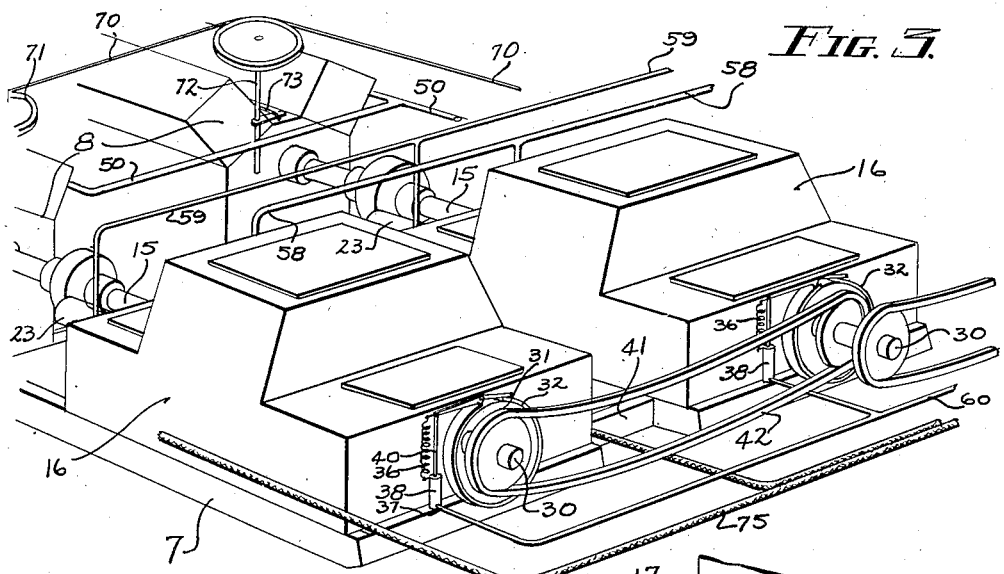
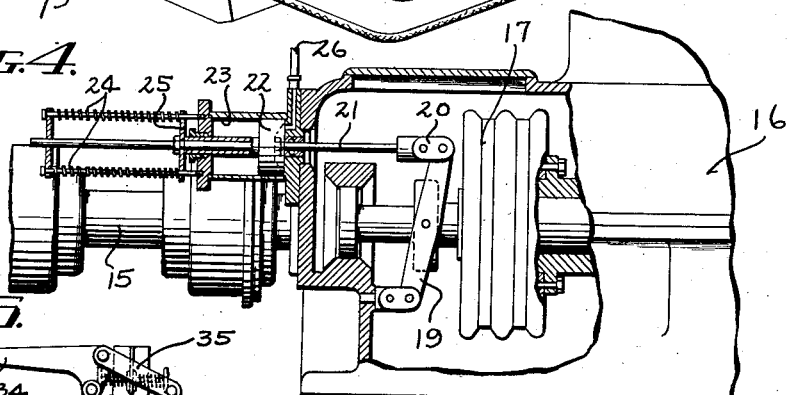
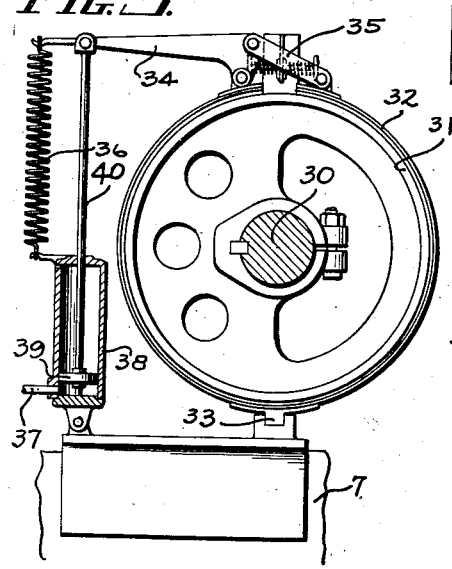
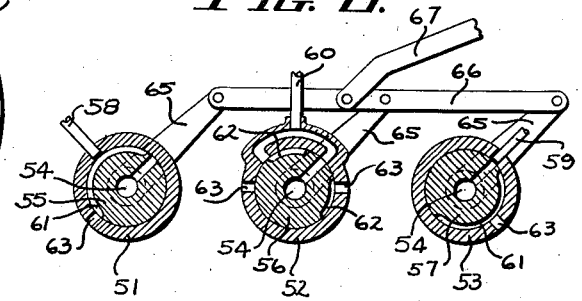
INVENTOR
Paul W. Eells
BY Wheeler, Wheeler & Wheeler
ATTORNEYS Patented June 4, 1935

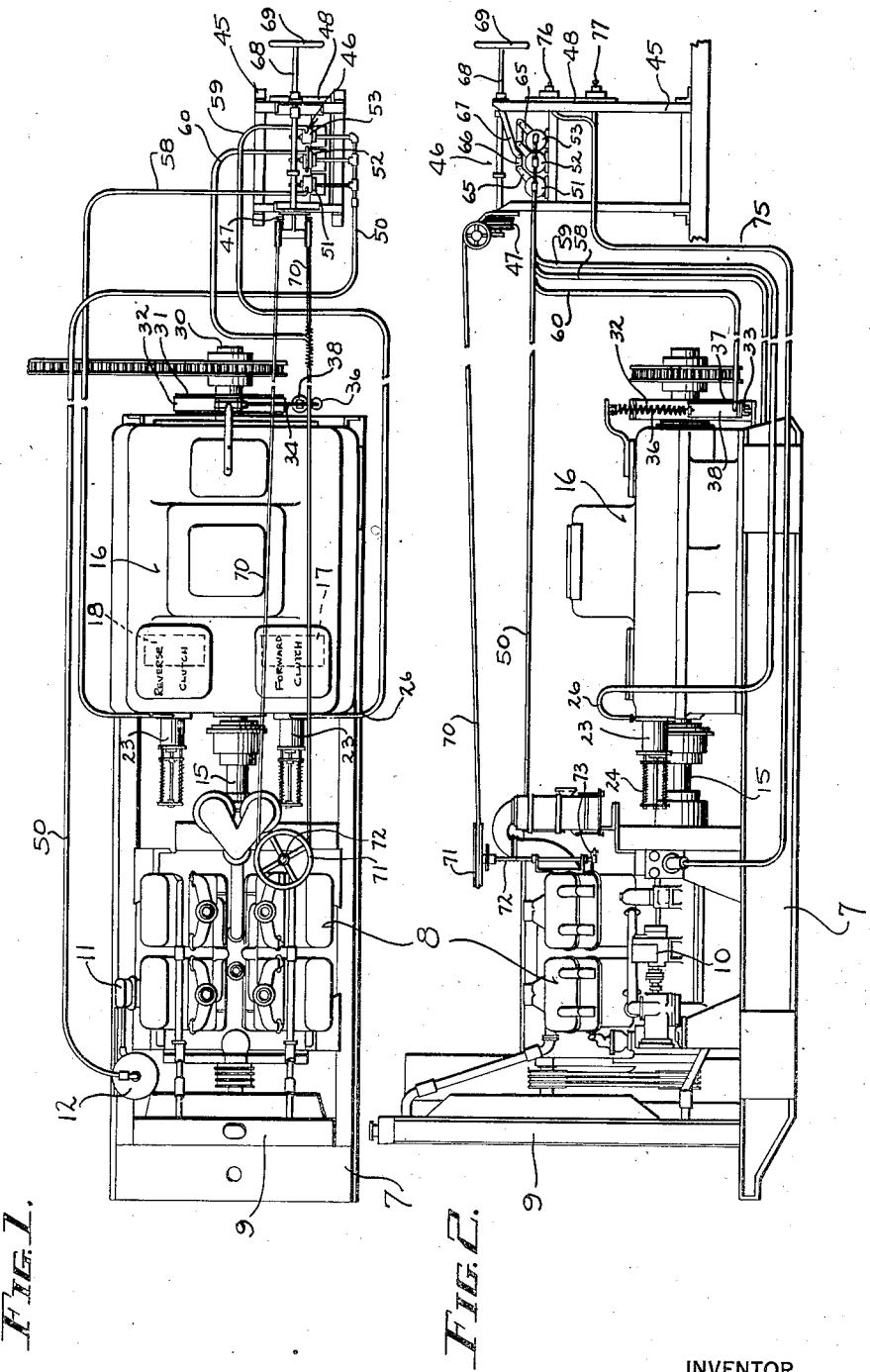

2,003,351

UNITED STATES PATENT OFFICE 2,003,351

POWER CONTROL

Paul W. Eells, West Allis, Wis., assignor to Le Roi Company, West Allis, Wis., a corporation of Wisconsin Application February 28, 1931, Serial No. 519,090

5 Claims. (Cl. 60—97)

This invention relates to improvements in power controls.

The particular apparatus illustrated in the drawings comprises a multiple power unit for use in oil fields where its power is employed in drilling and driving and pumping out wells. In such a device, and in many other devices of like characteristics, it is desirable to provide a remote control mechanism capable not alone of regulating the rate of operation of the internal combustion engine from which power is derived, but capable also of operating the clutch and brake devices of one or any number of power units in synchronism from a remote point. In referring to the synchronous operation of the controls, I refer not merely to the manipulation of identical clutches or brake mechanisms in a plurality of units, but to the properly timed operation of clutches and brakes in a single unit to produce the desired effect on the power output.

More specifically stated, it is my purpose to employ for some purposes a pneumatic control means, which has important advantages in this particular work over any other type of control. I also seek to consolidate mechanical, fluid and electrical controls in a single unit and to provide a control unit portable independently of the power unit and connected thereto only by flexible power transmission lines and lines which are adapted for synchronous control of multiple units.

A further objective of the invention is to arrange the forward and reverse clutch mechanisms and the brake mechanism in such a way that the clutch mechanisms will be applied by power and the brake mechanism maintained inoperative by power, so that in the event of any failure in the air supply the brake will automatically be engaged as the clutches become released, thereby preventing damage to the operative devices.

In the drawings:

Figure 1 is a diagrammatic plan view of a single power unit and remote control apparatus embodying this invention.

Figure 2 illustrates in side elevation the parts shown in Fig. 1.

Figure 3 is a fragmentary diagrammatic view in perspective, of an organization employing two such units as are illustrated in Figs. 1 and 2.

Figure 4 is an enlarged fragmentary detail, partially in elevation and partially in vertical axial section, of a clutch device embodying this invention.

Figure 5 is an enlarged fragmentary detail in end elevation, of a brake device forming a part of the mechanism herein illustrated.

Figure 6 is a diagrammatic illustration in section, of a valve organization capable of handling the pneumatic lines to the several pieces of control mechanism.

Like parts are identified by the same reference characters throughout the several views.

Each of the power units herein disclosed comprises a sled-like base 7 which may be pulled over the ground from place to place in order to permit of the disposition of one or several units as required for any given operation. Upon the base 7 is assembled a complete power plant including an engine 8 with a cooling system 9, ignition system 10, and a pneumatic system including compressor 11 and tank 12. The power output shaft 15 of each engine leads to a transmission unit 16 mounted upon the same base. This unit may be of any conventional design for any required change of speed or reverse.

For the purposes of the present invention it is sufficient to designate clutches 17 and 18 as forward and reversing clutches respectively. These clutches may be of the conventional disk type operated as shown in Fig. 4, by a shipping lever 19 which is connected by link 20 with the rod 21 of a piston 22 operating in a cylinder 23. The outward movement of piston 22 for engaging clutch 17 (or clutch 18) is opposed by compression springs 24 which act upon a cross head 25 carried by rod 21. The arrangement described is such that pressure communicated to cylinder 23 through pipe 26 will force the piston outwardly against the pressure of springs 24 and engage the clutch. Upon relief of pressure on pipe 26, the springs 24 are capable of releasing the clutch.

The output shaft 30 of each unit is provided with a brake which may be of the type illustrated in Fig. 5, including a drum 31 and a band 32 which is anchored at 33 and has a lever 34 for drawing its free ends together upon the drum. The lever is fulcrumed upon one of the ends of the band and connected by link 35 to the other. A tension spring 36 acts upon lever 34 in a direction to apply the brake. Rotation of shaft 30 is possible whenever pressure supplied through pipe 37 to cylinder 38 acts on piston 39 and rod 40 to lift the free end of lever 34 against the tension of spring 36.

Where two or more units are used together they are pulled on their sled-like bases 7 to adjacent positions, where they may be braced by the struts 41. Their respective shafts 30 are then suitably connected by a chain or belt 42 and power is taken from either of shafts 30 for the desired purposes.

In Figs. 1 and 2 I have represented at 45 a remote control station bearing valve mechanism at 46 for a clutch and brake control, a cable drum at 47 for engine throttle control, and a switch panel at 48 for ignition and starting motor control.

Although a single valve mechanism can readily be designed for controlling the brake and the several clutches, I have chosen, for convenience of illustration, to show each valve separately.

An air supply line 50 leads from tank 12 to the center of each of the valve casings 51, 52, and 53, and communicates with central ducts 54 in each of the several valve plugs 55, 56, and 57. A radial duct in each plug is registerable with the outlet port from the respective casing. The outlet ports of casings 51 and 53 lead to air lines 58 and 59 respectively, while casing 52 has a set of spaced ports both of which lead to the air line 60, which may thus be put under pressure in either of two positions of the plug 56.

For the relief of pressure in the respective lines, the plugs have passages 61 and 62 adapted in all inoperative positions of the plug to afford communication between the air lines and the vent ports 63.

For convenience of manipulation, the several plugs are preferably provided with like arms 65 connected by a link 66 which is fastened by a second link 67 to a reciprocable and rotatable shaft 68 having a hand wheel 69. When this shaft is reciprocated it oscillates the several valve plugs simultaneously between the extreme position indicated in Fig. 6, in which the air supply line communicates with pressure line 59, and another extreme position in which the air supply line communicates through plug 55 with pressure line 58.

In both of these extreme positions of the several plugs, the pressure line 60 will be in communication with the air supply line 50 through plug 56. In all intermediate positions of the several valve plugs the pressure in lines 58 and 59 will be relieved, and in the central position the pressure in line 60 will be relieved.

Line 58 leads to the reverse clutch of each unit. If there is a plurality of units the air line 58 is forked as shown in Fig. 3. Similarly, air line 59 leads to the forward clutch of each unit. Thus, regardless of how many units are involved, corresponding clutches of each of them will receive pressure from the same source at the same time through a single valve.

Similarly, the pressure line 60 leads to the air control cylinders of the brake mechanisms of each unit, so that whether there is one unit or several, each brake will be operated synchronously with each other brake, and necessarily will take effect only when the clutches are disengaged either through proper manipulation of the valve members, or through failure of the air supply.

While a reciprocatory motion of shaft 68 operates the valves as above described, it will be obvious that a rotary motion of such shaft will turn drum 47 which is carried thereby. The control cable 70 which passes about said drum with one or more turns, leads to similar drums or pulleys 71 which are mounted on shafts 72 connected to the carburetor throttle arms 73 of the respective engines. Thus, the rate of engine operation, the direction of delivery of its power output, and the operation of its brake, are all subject to control from a remote point together with the corresponding functions of other units which may be connected to it as described.

The ignition and starting controls correspond to those in general practice, except that the current is carried through a flexible cable 75 to the panel 48, where a single starting switch 76 and a single ignition switch 77 may care for the respective starting and ignition circuits of any number of power units as herein disclosed.

The control organization disclosed has great flexibility and combines in one apparatus a mechanical control represented by the cord or cable 70, a fluid control represented by the pneumatic system and valves, and an electrical control represented by the electrical cable 75 and switches 76 and 77.

It will be obvious that each control is flexible in the sense that the control station 45 may be located at any desired point with reference to the power units subject thereto. This is very important in the case of a portable power unit, the position of which must be adapted to conditions existing at each location in which it is used. Each control system is further adapted to regulate the operation of more than one unit, and this also is an important feature because of the fact that in one installation a power unit may be used alone, while in its next operation it may be coupled to other similar units.

I claim:

1. The combination with a plurality of power and transmission units having individual shaft controls and power delivery shafts coupled together, of an independently portable remote control station, and means at said station provided with power transmitting connections for the synchronous operation of the controls of the several units.

2. The combination with a plurality of portable power and transmission units having output shafts, clutch means controlling said shafts, engine speed regulators, and electrical control, of a single independently portable remote control station provided with means including power transmitting connections for the manipulation of the clutches, regulators, and electrical controls of the several units.

3. The combination with portable power unit including a prime mover and a transmission device, of a regulator for said prime mover, a control for said transmission, and an electrical control for said prime mover, of an independently portable remote control station provided with means including power transmitting connections for the manipulation of said regulator, said transmission control, and said electrical control.

4. The combination with a plurality of portable power units each including a prime mover and a transmission device, of an individual regulator for each prime mover, a control for each transmission, and an electrical control for each prime mover, of an independently portable remote control station provided with means including power transmitting connections for the simultaneous manipulation of said regulators, power transmitting connections for the simultaneous manipulation of said transmission controls, and power transmitting connections for the simultaneous manipulation of said electrical controls.

5. The combination with a portable power unit including a prime mover and a transmission device, of a regulator for said prime mover, a control for said transmission, and an electrical control for said prime mover, of an independently portable remote control station provided with means including power transmitting connections for the manipulation of said regulator, power transmitting connections for the manipulation of said transmission control, and power transmitting connections for the manipulation of said electrical control.

PAUL W. EELLS.